(12) United States Patent
Lee et al.

(10) Patent No.: US 10,944,118 B2
(45) Date of Patent: Mar. 9, 2021

(54) FUEL CELL SYSTEM FOR PREVENTING FLOODING OF A FUEL CELL STACK

(71) Applicants: HYUNDAI MOTOR COMPANY, Seoul (KR); KIA MOTORS CORPORATION, Seoul (KR)

(72) Inventors: Hyun Jae Lee, Seoul (KR); Yei Sik Jeon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 197 days.

(21) Appl. No.: 15/819,757

(22) Filed: Nov. 21, 2017

(65) Prior Publication Data

US 2018/0175421 A1 Jun. 21, 2018

(30) Foreign Application Priority Data

Dec. 16, 2016 (KR) .......................... 10-2016-0172999

(51) Int. Cl.
| | |
|---|---|
| *H01M 8/04828* | (2016.01) |
| *H01M 8/04746* | (2016.01) |
| *H01M 8/04119* | (2016.01) |
| *H01M 8/2465* | (2016.01) |
| *H01M 8/04082* | (2016.01) |
| *H01M 8/04492* | (2016.01) |
| *H01M 8/0432* | (2016.01) |

(52) U.S. Cl.
CPC ... *H01M 8/04835* (2013.01); *H01M 8/04126* (2013.01); *H01M 8/04201* (2013.01); *H01M 8/04507* (2013.01); *H01M 8/04753* (2013.01); *H01M 8/2465* (2013.01); *H01M 8/0432* (2013.01); *H01M 8/04358* (2013.01)

(58) Field of Classification Search
CPC ......... H01M 8/04141; H01M 8/04126; H01M 8/04149; H01M 8/04753; H01M 8/04835; H01M 8/04492; H01M 8/04828
See application file for complete search history.

(56) References Cited

U.S. PATENT DOCUMENTS

| | | | |
|---|---|---|---|
| 3,649,467 A * | 3/1972 | Winsel et al. ....... | B01D 61/364 202/160 |
| 9,461,318 B2 | 10/2016 | Kim et al. | |
| 9,660,280 B2 | 5/2017 | Lee et al. | |
| 9,768,456 B1 * | 9/2017 | Shim ................. | H01M 8/04507 |
| 2001/0015500 A1 * | 8/2001 | Shimanuki .......... | B01F 3/04007 261/104 |
| 2002/0148927 A1 * | 10/2002 | Dommer ................ | F42B 10/64 244/3.24 |

(Continued)

FOREIGN PATENT DOCUMENTS

| | | |
|---|---|---|
| KR | 10-2009-0100736 A | 9/2009 |
| KR | 10-1583914 B1 | 1/2016 |
| KR | 10-1592423 B1 | 2/2016 |

*Primary Examiner* — Imran Akram
(74) *Attorney, Agent, or Firm* — Morgan, Lewis & Bockius LLP

(57) ABSTRACT

A fuel cell system includes a fuel cell stack having a cathode and an anode, a humidifier configured to humidify air that is to be supplied to the cathode, an air supply unit configured to supply the air to the humidifier, and a controller. The controller is configured to adjust a flow rate of the air supplied from the air supply unit, based on a supply of the humidifier, to prevent flooding of the fuel cell stack.

12 Claims, 7 Drawing Sheets

(56) References Cited

U.S. PATENT DOCUMENTS

| | | | |
|---|---|---|---|
| 2004/0209153 A1* | 10/2004 | Peled | H01M 4/8605 429/414 |
| 2005/0053814 A1* | 3/2005 | Imamura | B60L 58/30 429/413 |
| 2005/0112418 A1* | 5/2005 | Roberts | H01M 8/04225 429/413 |
| 2006/0166058 A1* | 7/2006 | Kudo | H01M 8/04089 429/413 |
| 2007/0218326 A1* | 9/2007 | Liu | H01M 8/04111 429/414 |
| 2008/0050620 A1* | 2/2008 | Frost | H01M 8/04179 429/414 |
| 2008/0088043 A1* | 4/2008 | Daisuke | H01M 8/04082 261/130 |
| 2009/0053568 A1* | 2/2009 | Meyers | B60C 1/0016 429/429 |
| 2010/0009226 A1* | 1/2010 | Konrad | H01M 8/04111 429/415 |
| 2010/0021783 A1* | 1/2010 | Osada | H01M 8/04761 429/424 |
| 2010/0255390 A1* | 10/2010 | Tanaka | H01M 8/04141 429/413 |
| 2011/0053012 A1* | 3/2011 | Lee | H01M 8/04768 429/413 |
| 2011/0081588 A1* | 4/2011 | Korytnikov | H01M 8/04007 429/429 |
| 2013/0059214 A1 | 3/2013 | Patterson et al. | |
| 2013/0108936 A1* | 5/2013 | McElroy | H01M 8/0668 429/410 |
| 2015/0086894 A1* | 3/2015 | Ueda | H01M 8/04089 429/446 |
| 2015/0280260 A1 | 10/2015 | Lee et al. | |
| 2016/0036072 A1* | 2/2016 | Han | H01M 8/04225 429/413 |
| 2016/0036073 A1 | 2/2016 | Kim et al. | |

* cited by examiner

| CURRENT(A) | ACCUMULATED RATE OF CONDENSATE IN HUMIDIFIER TUBE(g/min) | AIR PURGE PERIOD (MINIUTE, BASED ON ACCUMULATED REQUIRED TIME CORRESPONDING TO 30G) |
|---|---|---|
| 11 | 0.93 | 32.2 |
| 22 | 1.14 | 26.3 |
| 32 | 1.18 | 25.5 |
| 43 | 1.41 | 21.3 |
| 54 | 1.06 | 28.3 |
| 72 | 0.46 | 65.7 |
| 86 | 0.31 | 97.8 |
| 108 | 0.14 | 211.8 |

FIG.2

FUEL CELL SYSTEM FOR PREVENTING FLOODING OF A FUEL CELL STACK

CROSS-REFERENCE TO RELATED APPLICATION

This application is based on and claims the benefit of priority to Korean Patent Application No. 10-2016-0172999, filed on Dec. 16, 2016, with the Korean Intellectual Property Office, the disclosure of which is incorporated herein in its entirety by reference.

TECHNICAL FIELD

The present disclosure relates to a fuel cell system.

BACKGROUND

In general, a fuel cell vehicle includes a fuel cell stack in which a plurality of fuel cells used as power sources are stacked on each other, a fuel supply system configured to supply a fuel, such as hydrogen, to the fuel cell stack, and an air supply system configured to supply oxygen as an oxidant required for an electrochemical reaction.

When hydrogen is supplied to an anode of the stack, and oxygen is supplied to a cathode of the stack, hydrogen ions are separated in the anode through a catalytic reaction. The separated hydrogen ions are transferred to an oxidation electrode, which is the cathode, through an electrolyte membrane, and the hydrogen ions separated in the anode cause an electrochemical reaction together with electrons and oxygen in the oxidation electrode. Accordingly, electric energy may be obtained through the electrochemical reaction.

Electrochemical oxidation of the hydrogen occurs in the anode, and electrochemical reduction of the oxygen occurs in the cathode. At this time, electricity and heat are generated due to movements of generated electrons, and vapor or water is generated due to a chemical action of bonding the hydrogen and the oxygen to each other.

Further, when air humidified by a humidifier provided at a front end of the fuel cell stack is supplied to the fuel cell stack, vapor is condensed due to a temperature difference between the humidified air and outside air.

In particular, a phenomenon in which condensate is accumulated in the humidifier occurs in a low power section. There is a problem in that when the condensate is introduced into the stack, a lot of water exists in an ion exchange membrane (flooding), the vapor is easily liquefied, contact between a catalyst and a reaction gas is disturbed, and thus, reaction efficiency of the fuel cell stack is reduced.

Thus, development of a device configured to prevent the condensate from being introduced into the stack is required to prevent generation of the flooding in advance.

SUMMARY

The present disclosure provides a fuel cell system which prevents condensate in a humidifier from being supplied to a cathode at an allowable flow rate or more, thereby preventing generation of flooding.

Further, the present disclosure also provides a fuel cell system in which a flow rate of air supplied from an air supply unit is increased to reduce condensate in a humidifier, so that the condensate remaining in the fuel cell stack is evaporated or the condensate is forcibly discharged to an outlet of the fuel cell stack.

The technical objects of the present disclosure are not limited to the above-mentioned one, and the other unmentioned technical objects will become apparent to those skilled in the art from the following description.

In accordance with an aspect of the present invention, a fuel cell system may include a fuel cell stack having a cathode and an anode, a humidifier configured to humidify air that is to be supplied to the cathode, an air supply unit configured to supply the air to the humidifier, and a controller. The controller may be configured to adjust a flow rate of the air supplied from the air supply unit, based on a supply of the humidifier, to prevent the fuel cell stack from being flooded.

BRIEF DESCRIPTION OF THE DRAWINGS

The above and other objects, features and advantages of the present disclosure will be more apparent from the following detailed description taken in conjunction with the accompanying drawings:

FIG. 2 is a table representing an amount of accumulated condensate, which is estimated according to an output current of a stack;

DETAILED DESCRIPTION

Figure 1:
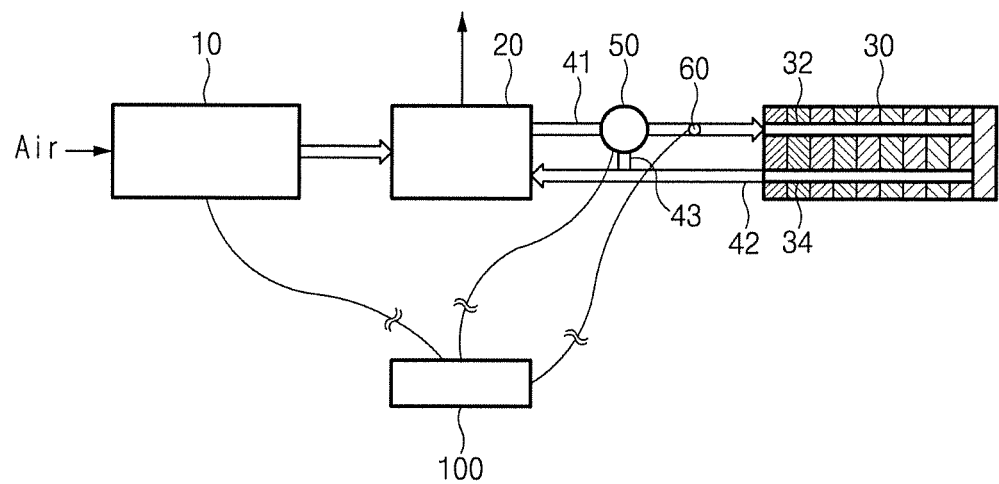
FIG. 1 is a view illustrating a fuel cell system according to an exemplary embodiment of the present disclosure.

Hereinafter, exemplary embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of exemplary embodiments of the present disclosure, when it is determined that detailed descriptions of well-known configurations or functions disturb understanding of the exemplary embodiments of the present disclosure, the detailed descriptions will be omitted.

FIG. 1 is a view illustrating a fuel cell system according to an exemplary embodiment of the present disclosure. Descriptions will be made with reference to FIG. 1. As illustrated in FIG. 1, a fuel cell system includes a fuel cell stack 30 having a cathode and an anode, a humidifier 20, an air supply unit 10, and a controller 100.

The controller 100 is an electric circuitry that executes instructions of software which thereby performs various functions described hereinafter.

The humidifier 20 may be configured to humidify air that is to be supplied to the cathode, and the air supply unit 10 may be configured to supply the air to the humidifier 20. To prevent flooding of the fuel cell stack 30, the controller 100 may be configured to control the air supply unit 10 based on a supply of the humidifier 20, to adjust a flow rate of air supplied from the air supply unit 10.

The controller 100 may be configured to control the air supply unit 10 according to an amount of accumulated condensate in the humidifier 20, which is the supply of the humidifier 20.

When the amount of the accumulated condensate in the humidifier 20 is not less than a reference value, the controller 100 may be configured to remove the condensate in the humidifier 20 and the condensate in the fuel cell stack 30 before the flooding occurs, to prevent the flooding from occurring as the condensate in the humidifier 20 is transferred to the cathode at an allowable flow rate or more by air passing through the humidifier 20.

To remove the condensate, the controller 100 may be configured to control the air supply unit 10 to increase the flow rate of the supplied air.

When the amount of the accumulated condensate is not less than the reference value, the controller 100 may be configured to control the air supply unit 10 to maintain, for a specific time period, an operation state in which revolutions per minute (RPM) of the air supply unit 10 is increased to a target RPM. As an example, the reference value of the amount of the accumulated condensate may be 30 g. When the amount of the accumulated condensate is 30 g, the controller 100 may be configured to control the RPM of the air supply unit 10 for one second to increase the flow rate of the supplied air.

As an example, when it is determined that the amount of the accumulated condensate is 30 g in a state in which the air supply unit 10 is operated at 35 kilo-revolutions per minute (KRPM), the controller 100 may control the air supply unit 10 to be operated at 65 KRPM which is a target RPM for one second, by increasing the operation RPM of the air supply unit 10 by 30 KRPM.

As an example, even though the condensate remains in the fuel cell stack 30, to reduce the condensate in the humidifier 20, the controller 100 may increase the flow rate of the air supplied from the air supply unit 10, to evaporate the condensate remaining in the fuel cell stack 30 or forcibly discharge the condensate to the outlet of the fuel cell stack 30, thereby preventing the flooding from occurring, in advance.

Figure 3:
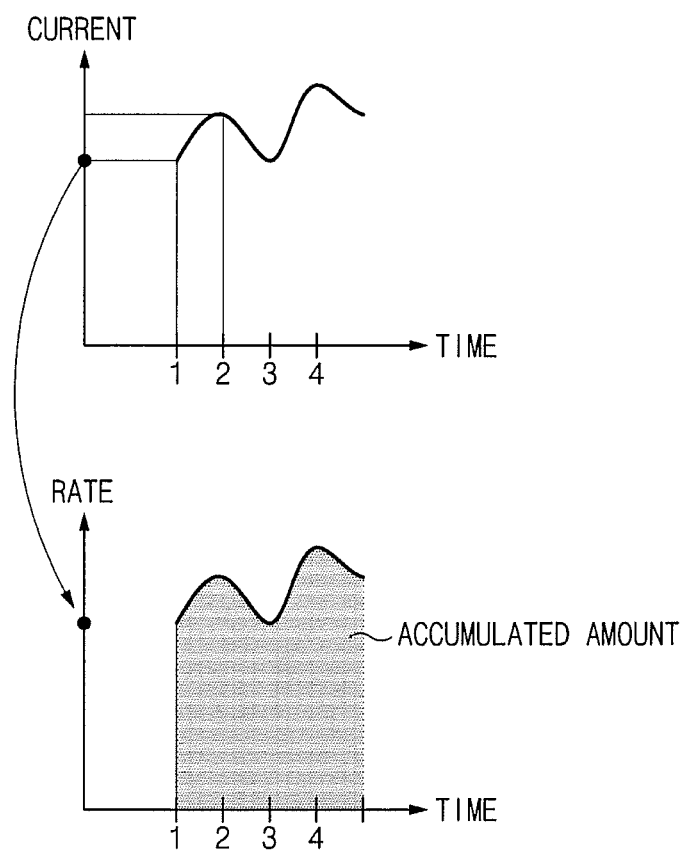
FIG. 3 is a graph depicting the amount of the accumulated condensate, which is estimated according to the output current of the stack.

FIG. 2 is a table representing an amount of accumulated condensate, which is estimated according to an output current of a stack, and FIG. 3 is a graph depicting the amount of the accumulated condensate, which is estimated according to the output current of the stack. As illustrated in FIGS. 1 to 3, the controller 100 may be configured to estimate the amount of the accumulated condensate by integrating, over time, an accumulated rate of the condensate, which is a rate at which the condensate is accumulated per hour in the humidifier 20 according to an output current of the fuel cell stack 30.

As an example, as illustrated in FIG. 3, the controller 100 may estimate the amount of the accumulated condensate through experimental data obtained by integrating, over time, the accumulated rate at which the condensate is accumulated per hour in the humidifier 20 according to the output current her hour of the fuel cell stack 30.

Figure 4:
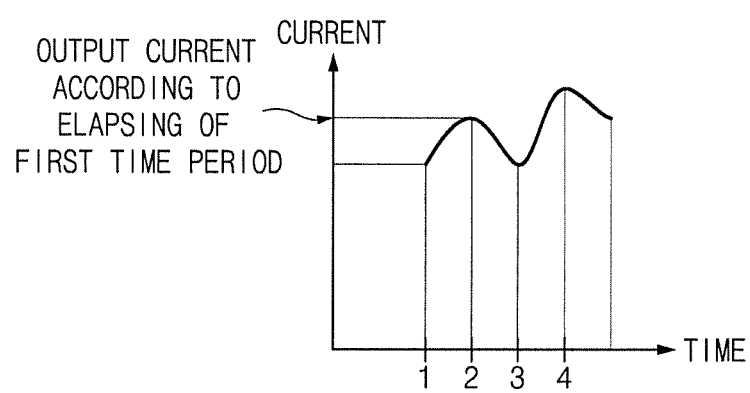
FIG. 4 is a graph depicting the output current of the stack according to a time.

FIG. 4 is a graph depicting the output current of the stack according to a time. As illustrated in FIG. 4, the controller 100 may be configured to determine the accumulated rate of the condensate according to an output current at that time whenever a first preset time period elapses or determine the accumulated rate of the condensate according to an average value of output currents during a second preset time period whenever the second preset time period elapses.

Further, the accumulated rate of the condensate may be determined according to an amount of accumulated charges of an output current during a specific time period.

As an example, the first time period may be configured to determine the accumulated rate of the condensate according to the output current by checking the output current in every 30-40 seconds.

Figure 5:
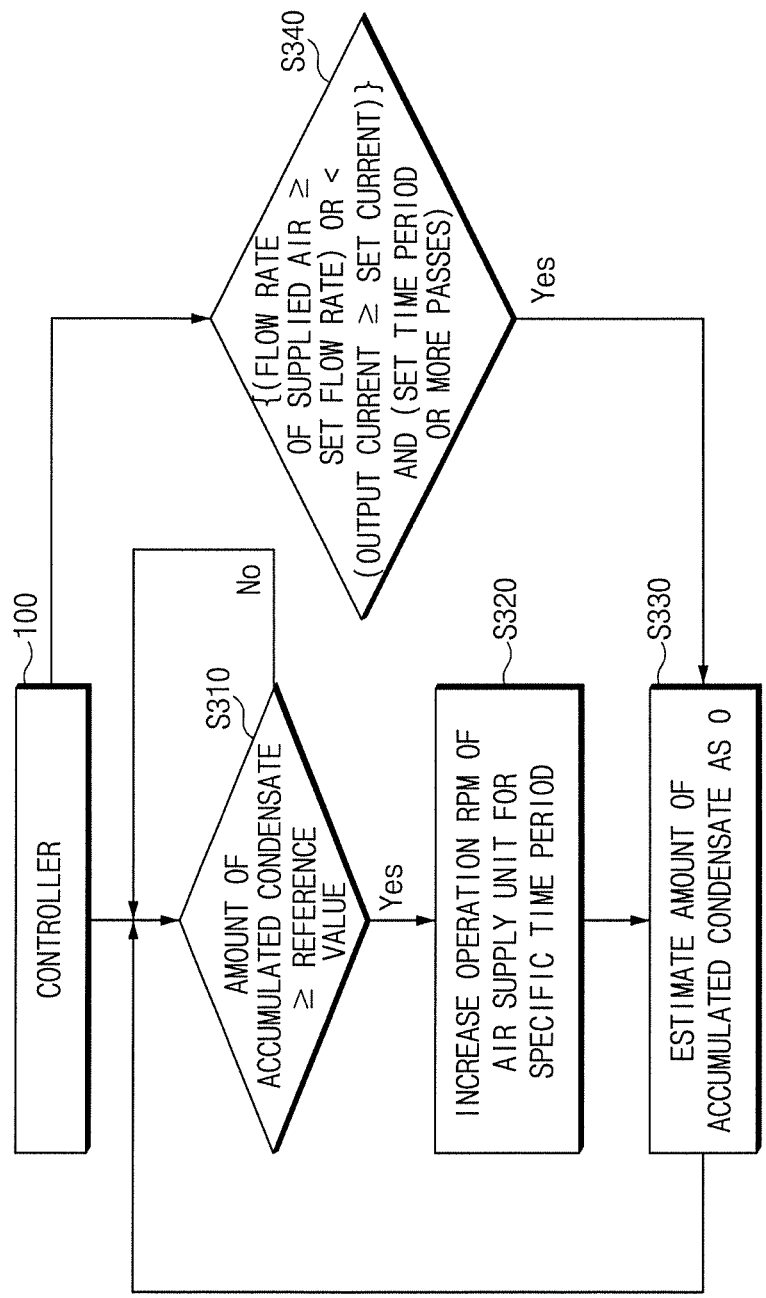
FIG. 5 is a flowchart illustrating the fuel cell system according to the exemplary embodiment of the present disclosure.

FIG. 5 is a flowchart illustrating the fuel cell system according to an exemplary embodiment of the present disclosure. As illustrated in FIG. 5, the controller 100 may be configured to increase the operation RPM of the air supply unit 10 during a predetermined time period, when the amount of the accumulated condensate is not less than the reference value (S310).

The controller 100 may perform a control such that an operation state in which the operation RPM of the air supply unit 10 is increased to the target RPM is maintained for a specific time period. The controller 100 may control the air supply unit 10 while the operation state in which the RPM is increased is maintained for a specific time period (S320), and then may estimate the amount of the accumulated condensate as 0 (S330). The controller 100 may be configured to calculate the amount of the accumulated condensate from this time again. The controller 100 may be configured to estimate the amount of the accumulated condensate as 0 (S330), when a state in which the flow rate of the supplied air is not less than a set flow rate or the output current of the fuel cell stack 30 is not less than a set current is maintained for a specific time period (S340). The controller 100 may be configured to calculate the amount of the accumulated condensate from this time again.

As an example, the flow rate of the supplied air may be 200 kg/hr, and the output current may be 130 A or more.

As an example, when the flow rate of the supplied air is not less than the set flow rate for a set time period or the output current of the fuel cell stack 30 is not less than a set current for the set time period, the controller 100 may autonomously determine that the condensate in the humidifier 20 is discharged, to estimate the amount of the accumulated condensate as 0.

As an example, when a consumer steps on an accelerator during driving, a speed of a vehicle increases, and accordingly, a flow rate of supplied air increases, and an output current increases. In this case, the controller 100 may determine that the condensate in the humidifier 20 is discharged, based on the increase in the flow rate of the air supplied from the air supply unit 10, to estimate the amount of the accumulated condensate as 0.

The accumulated rate of the condensate of the fuel cell system according to the present exemplary embodiment may be determined according to at least one of the temperature of outside air, the temperature of cooling water of an air cooler, the temperature of air at a front end of the humidifier 20, and the temperature of air at a front end of the cathode in addition to the output current.

As an example, in addition to the output current, when it is determined at least one of that the temperature of the outside air is lower than a first reference temperature, that the temperature of the cooling water is lower than a second reference temperature, that the temperature of the air at the front end of the humidifier 20 is lower than a third reference temperature, and that the temperature of the air at the front end of the cathode is lower than a fourth reference temperature (S210), the controller 100 may perform a control to increase the flow rate of the air supplied from the air supply unit 10.

As an example, the first reference temperature may be 30° C., the second reference temperature may be 40° C., the third reference temperature may be 40° C., and the fourth reference temperature may be 40° C.

As an example, the controller 100 may determine that the internal temperature of the humidifier 20 is low, when at least one of the temperature of the outside air, the temperature of the cooling water, the temperature of the air at the front end of the humidifier 20, and the temperature of the air at the front end of the cathode is lower than the reference temperature.

The controller 100 may include the above-described reference temperature condition to estimate the amount of the accumulated condensate or to more accurately estimate the amount of the accumulated condensate, based on the output current.

As an example, because the condensate accumulated in the humidifier 20 may be greatly different depending on the output current, at least one of the temperature of the outside air, the temperature of the cooling water, the temperature of the air at the front end of the humidifier 20, and the temperature of the air at the front end of the cathode may be additionally considered.

Further, the controller 100 controls the flow rate of the air supplied from the air supply unit 10 while the reference temperature condition is satisfied as well as controls the air supply unit 10 by a value obtained by estimating the amount of the accumulated condensate based on the output current, so as not to unnecessarily drive the air supply unit 10. As an example, the controller 100 may recognize a current situation as a dangerous situation when it is estimated that the amount of the accumulated condensate is 30 g, and accordingly, may determine that a current situation is a more dangerous situation when the temperature condition is lower than the reference temperature.

As illustrated in FIG. 1, the fuel cell system according to the present exemplary embodiment may further include a first passage 41, a second passage 42, a third passage 43, and a bypass valve 50.

The first passage 41 may be configured to guide the air humidified by and discharged from the humidifier 20 to the fuel cell stack 30. The second passage 42 may be configured to guide the air discharged from the fuel cell stack 30 to the outside. The first passage 41 and the second passage 42 may be connected to each other by the third passage 43.

The bypass valve 50 may be provided at a connection point between the first passage 41 and the third passage 43, and the bypass valve 50 may be configured to adjust an amount of air of the first passage 41, which is bypassed to the third passage 43. The controller 100 may be configured to control the bypass valve 50 in addition to the air supply unit 10, based on the supply of the humidifier 20.

When the amount of the accumulated condensate in the humidifier 20, as the supply of the humidifier 20, is not less than the reference value, the controller 100 may be configured to control the air supply unit 10 to increase the flow rate of the supplied air, and to control the bypass valve 50 to increase the amount of the air of the first passage 41, which is bypassed to the third passage 43.

As an example, when the air in the first passage 41 is bypassed to the third passage 43, the condensate in the humidifier 20 may be prevented from being introduced into the fuel cell stack 30.

As an example, when a portion of the air in the first passage 41 is bypassed to the third passage 43, the controller 100 may maintain, for a specific time period, the operation state in which the operation RPM of the air supply unit 10 is increased to the target RPM, to evaporate the condensate remaining in the fuel cell stack 30 or forcibly discharge the condensate to the outlet of the fuel cell stack 30, thereby preventing the flooding from occurring, in advance.

The fuel cell stack 30 includes an inlet air distributor 32 and an outlet air distributor 34. The inlet air distributor 32 may be configured to distribute the air supplied by the humidifier 20 to a plurality of cathodes, and the outlet air distributor 34 may be configured to collect and discharge the air discharged from the plurality of cathodes. The third passage 43 may communicate with the inlet air distributor 32 and the outlet air distributor 34.

As an example, the first passage 41 may be connected to the inlet air distributor 32, and the second passage 42 may be connected to the outlet air distributor 34. As an example, the second passage 42 may be connected to the humidifier 20.

The fuel cell system according to the present exemplary embodiment may further include a control valve 60. The control valve 60 may be connected to the inlet air distributor 32, and the control valve 60 may be configured to adjust amounts of the air distributed to the plurality of cathodes.

As an example, the control valve 60 may be an air shut-off valve. When the amount of the accumulated condensate in the humidifier 20, as the supply of the humidifier 20, is not less than the reference value, the controller 100 may be configured to control the air supply unit 10 to increase the flow rate of the supplied air, and to control the control valve 60 to increase an opening degree of the control valve 60.

Figure 6:
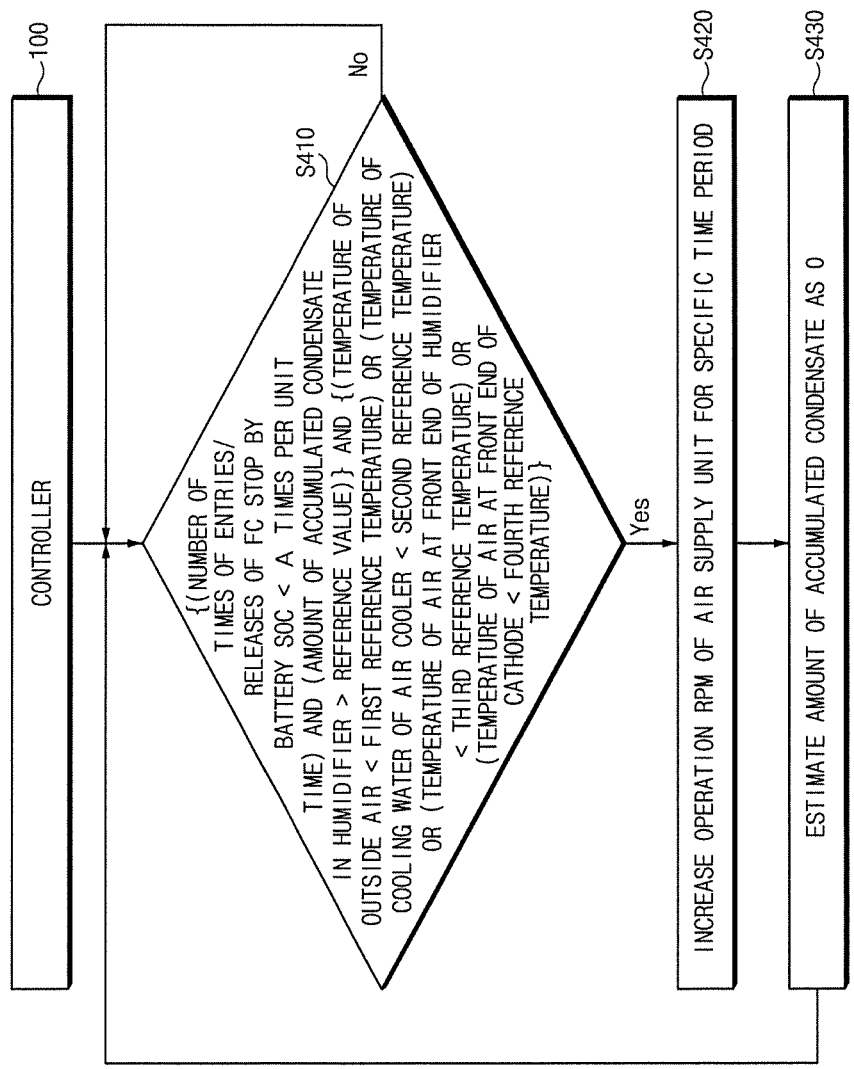
FIG. 6 is a flowchart illustrating a process of determining whether the number of times of entries/releases of FC stops by a battery SOC is not more than a reference number of times per reference time period, by a controller.

FIG. 6 is a flowchart illustrating a process of determining whether the number of times of entries/releases of FC stops by a battery SOC is not more than a reference number of times per reference time period, by the controller 100. As illustrated in FIG. 6, the controller 100 may determine whether the amount of the accumulated condensate in the humidifier 20, as the supply of the humidifier 20, is not less than the reference value, and the number of times of entries/releases of FC stops by a battery SOC is not more than the reference number of times per reference time period.

The controller 100 may perform a control such that the operation state in which the RPM of the air supply unit 10 is increased to the target RPM is maintained for a specific time period, when the amount of the accumulated condensate in the humidifier 20 is not less than the reference value, and the number of times of entries/releases of FC stops by a battery SOC is not more than the reference number of times per reference time period.

Further, in addition to that the amount of the accumulated condensate in the humidifier 20 is not less than the reference value, and the number of times of entries/releases of FC stops by a battery SOC is not more than the reference number of times per reference time period, at least one of the temperature of the outside air, the temperature of the cooling water of the air cooler, the temperature of the air at the front end of the humidifier 20, and the temperature of the air at the front end of the cathode is considered, Herein, the battery SOC may mean a residual amount of a battery, and the FC stop may mean that driving of the air supply unit 10 and operations of main components of the fuel cell stack 30 are stopped when a specific power or less is required. As an example, when a vehicle stops, it is not necessary to output power of the fuel cell stack 30, and a required minimum power may be covered by an auxiliary battery. When the specific power or less is required, the fuel cell stack 30 may mean that a driving operation of an air compressor or the like is stopped.

In connection with the number of times of entries/releases of FC stops, when the vehicle stops for a long time, an output capacity which may be handled by the battery is limited. As an example, when the battery SOC is decreased to 20 or less, a small amount of power of the fuel cell stack 30 is output. Here, the FC stop is released. However, thereafter, when the vehicle continuously stops, the FC stop is entered. As an example, even when the vehicle stops for a long time, an output capacity that may be covered by the battery is limited. Accordingly, when the battery SOC is decreased to, for example, 20 or less, a small amount of power is output from the fuel cell. Here, the FC stop is forcibly released, and thereafter, when the vehicle continuously stops, the FC stop is entered again.

When the amount of the accumulated condensate in the humidifier 20 is not less than the reference value, and the number of times of entries/releases of FC stops is not more than the reference number of times per reference time period, whether the temperature of the outside air is lower than the first reference temperature may be determined, whether the temperature of the cooling water is lower than the second reference temperature may be determined, whether the temperature of the air at the front end of the humidifier 20 is lower than the third reference temperature may be determined, and whether the temperature of the air at the front end of the cathode is lower than the fourth reference temperature may be determined. When the temperature of the outside air, the temperature of the cooling water of the air cooler, the temperature of the air at the front end of the humidifier 20, and the temperature of the air at the front end of the cathode are lower than the reference temperatures (S410), the controller 100 may perform a control such that the operation state in which the operation RPM of the air supply unit 10 is increased to the target RPM is maintained for a specific time period to increase the flow rate of the supplied air (S420). Thereafter, the controller 100 may determine that the flow rate of the air supplied from the air supply unit 10 is increased so that the condensate in the humidifier 20 is discharged, and thus, may estimate the amount of the accumulated condensate as 0 (S430).

As an example, the battery SOC may be approximately 20 to 80, the reference time period may be 10 to 20 minutes, and the reference number of times may be one to two times.

As an example, the first reference temperature may be 30° C., the second reference temperature may be 40° C., the third reference temperature may be 40° C., and the fourth reference temperature may be 40° C.

As an example, when the battery SOC is not more than 20, a small amount of power of the fuel cell stack 30 is output to the vehicle. Here, the FC stop is released. However, when the vehicle continuously stops after then, the FC stop is entered. Here, as a stop time of the vehicle is lengthened, the amount of the condensate in the humidifier 20 increases. When the number of times of FC stop releases of the entries/releases of the FC stop is not less than the reference number of times per reference time period, the controller 100 may determine that the vehicle is not stopped for a long time.

As an example, when the battery SOC is not more than 20, if the number of times of the entries/releases of the FC stop is not more than one to two times per 10 to 20 minutes, the controller 100 may determine that the vehicle stops for a long time, and thus the amount of the condensate in the humidifier 20 increases.

As an example, the controller 100 may determine that the internal temperature of the humidifier 20 is low, when at least one of the temperature of the outside air, the temperature of the cooling water, the temperature of the air at the front end of the humidifier 20, and the temperature of the air at the front end of the cathode is not more than the reference temperature. The controller 100 may include the above-described reference temperature condition to estimate the amount of the accumulated condensate or to more accurately estimate the amount of the accumulated condensate, based on the output current.

When the amount of the accumulated condensate is not less than the reference value, and the above-described temperature conditions are lower than the reference temperatures, the controller 100 may recognize a current situation as a dangerous situation. In addition, when the number of times of entries/releases of the FC stop by the battery SOC is not more than the reference number of times per reference time period, the controller 100 may recognize a current situation as a more dangerous situation.

Herein, the dangerous situation may mean that the amount of the condensate in the humidifier 20 increases.

When it is determined that the number of times of the entries/releases of the FC stop by the battery SOC is not more than the reference number of times per reference time period, the amount of the accumulated condensate is not less than the reference value, and at least one of the temperature of the outside air, the temperature of the cooling water, the temperature of the air at the front end of the humidifier 20, and the temperature of the air at the front end of the cathode is not more than the reference temperature, the controller 100 may perform a control such that the operation state in which the operation RPM of the air supply unit 10 is increased to the target RPM is maintained for a specific time period, thereby preventing the fuel cell stack 30 from being flooded, in advance. This is not to supercharge the flow rate of the air supplied from the air supply unit 10 any time but to supercharge the flow rate of the air supplied from the air supply unit 10 according to a condition having a probability that a flooding situation may occur, thereby improving reaction efficiency of the fuel cell stack 30.

Figure 7:
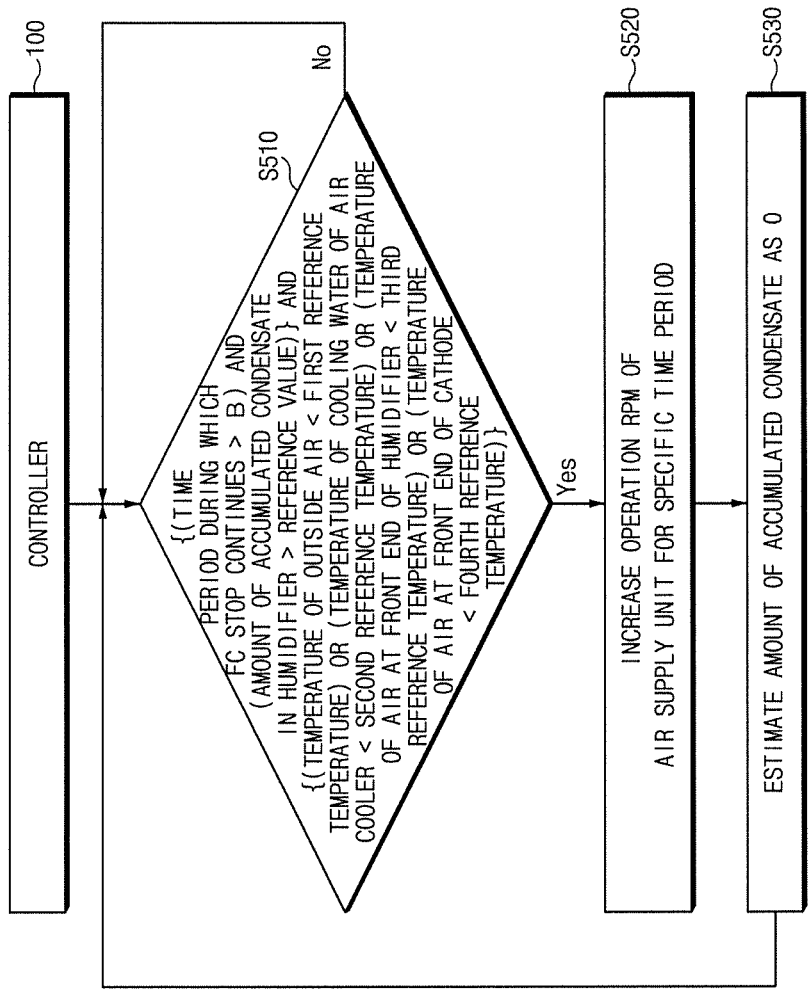
FIG. 7 is a flowchart illustrating a process of determining whether a holding time period of a FC stop is not less than a reference time period, by the controller.

FIG. 7 is a flowchart illustrating a process of determining whether the holding time period of the FC stop is not less than the reference time period, by the controller 100. As illustrated in FIG. 7, the controller 100 may determine whether the amount of the accumulated condensate in the humidifier 20, as the supply of the humidifier 20, is not less than the reference value. When the holding time period of the FC stop is not less than the reference time period (S510), the controller 100 may perform a control such that the operation state in which the operation RPM of the air supply unit 10 is increased to the target RPM is maintained for a specific time period, to increase the flow rate of the supplied air (S520). Thereafter, the controller 100 may determine that the flow rate of the air supplied from the air supply unit 10 is increased so that the condensate in the humidifier 20 is discharged, and thus, may estimate the amount of the accumulated condensate as 0 (S530).

As an example, the reference time period may be one second to 10 minutes.

As an example, when the holding time period of the FC stop is long, the amount of the condensate in the humidifier 20 may increase as the stop time of the vehicle is lengthened. Thus, the controller 100 may perform a control such that the operation RPM of the air supply unit 10 is increased to the target RPM to increase the flow rate of the supplied air.

As an example, the controller 100 may control the air supply unit 10 to be operated at 65 KRPM which is a target RPM for one second, by increasing the operation RPM of the air supply unit 10 by 30 KRPM.

That is characterized in that the controller 100 may determine the amount of the accumulated condensate in the humidifier 20 and the holding time period of the FC stop, to increase the flow rate of the supplied air, thereby preventing the fuel cell stack 30 from being flooded, in advance.

Further, the flow rate of the air supplied from the air supply unit 10 is not supercharged at any time but the flow rate of the air supplied from the air supply unit 10 is supercharged according to a condition having a probability that the fuel cell stack 30 is flooded, so that unnecessary driving is not performed.

This is characterized in that a condition having a probability that a flooding situation may occur is further segmented, so that the air supply unit is driven only when there is a probability that the flooding situation may occur.

Accordingly, the condensate in the humidifier is prevented from being supplied to the cathode at an allowable flow rate or more, so that a flooding situation may be prevented from occurring.

Further, a flow rate of air supplied from an air supply unit is increased to reduce condensate in the humidifier, and thus, the condensate remaining in a fuel cell stack is evaporated or the condensate is forcibly discharged to an outlet of the fuel cell stack, so that, a flooding situation may be prevented from occurring, in advance.

The above description is merely illustrative description of the technical spirit of the present disclosure, and various modifications and deformations may be made by those skilled in the art to which the present disclosure pertains without departing from the essential feature of the present disclosure. Thus, the exemplary embodiments that are disclosed in the present disclosure are not for limiting but for describing the technical spirit of the present disclosure, and the scope of the technical spirit of the present disclosure is not limited by the exemplary embodiments. The protection scope of the present disclosure should be interpreted by the appended claims and all the technical spirit corresponding to the equivalents thereof should be interpreted to be included in the scope of a right of the present disclosure.

What is claimed is:

1. A fuel cell system for preventing flooding of a fuel cell stack comprising:
    a fuel cell stack having a cathode and an anode;
    a humidifier configured to humidify air, including oxygen, that is to be supplied to the cathode;
    an air supply unit configured to supply the air to the humidifier;
    a first passage configured to guide the air humidified and discharged by the humidifier to the fuel cell stack in which a condensate is generated due to a chemical action between hydrogen, received at the anode, and the oxygen;
    a second passage configured to guide the air, a portion of which has been used for generating the condensate in the fuel cell stack, discharged by the fuel cell stack to outside;
    a third passage connecting the first passage to the second passage;
    a bypass valve disposed at a connection point between the first passage and the third passage to adjust an amount of the air of the first passage, which is bypassed to the third passage; and
    a controller programmed to control the air supply unit to adjust a flow rate of the air supplied from the air supply unit, based on an amount of an accumulated condensate in the humidifier, thereby preventing flooding of the fuel cell stack,
    wherein the controller is programmed such that, when the amount of the accumulated condensate in the humidifier is not less than a reference value, the controller controls the air supply unit to increase the flow rate of the supplied air so as to remove the condensate in the humidifier and the condensate in the fuel cell stack before the flooding occurs as the condensate in the humidifier is transferred to the cathode at an allowable flow rate or more by the air passing through the humidifier, and
    wherein the controller is programmed to control the bypass valve in addition to the air supply unit, based on the amount of the accumulated condensate in the humidifier.

2. The fuel cell system of claim 1, wherein the controller is programmed to estimate the amount of the accumulated condensate by integrating, over time, an accumulation rate of the condensate, which is a rate at which the condensate is accumulated per hour in the humidifier according to an output current of the fuel cell stack.

3. The fuel cell system of claim 2, wherein the controller is programmed to determine the accumulated rate of the condensate according to the output current whenever a first preset time period elapses or to determine the accumulated rate of the condensate according to an average value of the output current during a second preset time period whenever the second preset time period elapses.

4. The fuel cell system of claim 2, wherein the controller is programmed to determine the accumulated rate of the condensate based on at least one of temperature of outdoor air, temperature of cooling water of an air cooler, temperature of air at a front end of the humidifier, and temperature of air at a front end of the cathode in addition to the output current.

5. The fuel cell system of claim 1, wherein the controller is programmed such that, when the amount of the accumulated condensate is not less than the reference value, the controller controls the air supply unit such that an operation state in which an operation RPM of the air supply unit is increased to a target RPM is maintained for a specific time period.

6. The fuel cell system of claim 5, wherein the controller is programmed to estimate the amount of the accumulated condensate as zero after controlling the air supply unit to maintain the operation state for the specific time period, and to calculate the amount of the accumulated condensate from a time point when the controller estimates the amount of the accumulated condensate as zero.

7. The fuel cell system of claim 1, wherein the controller is programmed such that, when a state in which the flow rate of the supplied air is not less than a set flow rate or an output current of the fuel cell stack is not less than a set current is maintained for a set time period, the controller estimates the amount of the accumulated condensate as zero, and calculates the amount of the accumulated condensate from a time point when the controller estimates the amount of the accumulated condensate as zero.

8. The fuel cell system of claim 1,
wherein the controller is programmed such that, when the amount of the accumulated condensate in the humidifier is not less than a reference value, the controller controls the air supply unit to increase the flow rate of the supplied air, and controls the bypass valve to increase an amount of the air of the first passage, which is bypassed to the third passage.

9. The fuel cell system of claim 1, further comprising:
an inlet air distributor configured to distribute the air supplied by the humidifier to the plurality of cathodes; and
an outlet air distributor configured to collect and discharge the air discharged from the plurality of cathodes,
wherein the third passage communicates with the inlet air distributor and the outlet air distributor.

10. The fuel cell system of claim 9, further comprising:
a control valve provided in the inlet air distributor to adjust an amount of the air distributed to the plurality of cathodes,
wherein the controller is programmed such that, when the amount of the accumulated condensate in the humidifier is not less than a reference value, the controller controls the air supply unit to increase the flow rate of the supplied air and controls the control valve to increase an opening degree of the control valve.

11. A fuel cell system for preventing flooding of a fuel cell stack comprising:
a fuel cell stack having a cathode and an anode;
a humidifier configured to humidify air, including oxygen, that is to be supplied to the cathode;
an air supply unit configured to supply the air to the humidifier;
a first passage configured to guide the air humidified and discharged by the humidifier to the fuel cell stack in which a condensate is generated due to a chemical action between hydrogen, received at the anode, and the oxygen;
a second passage configured to guide the air, a portion of which has been used for generating the condensate in the fuel cell stack, discharged by the fuel cell stack to outside;
a third passage connecting the first passage to the second passage;
a bypass valve disposed at a connection point between the first passage and the third passage to adjust an amount of the air of the first passage, which is bypassed to the third passage; and
a controller programmed to control the air supply unit to adjust a flow rate of the air supplied from the air supply unit, based on an amount of an accumulated condensate in the humidifier, thereby preventing flooding of the fuel cell stack,
wherein the controller is programmed such that, when the amount of the accumulated condensate in the humidifier is not less than a reference value, and a number of times of entries/releases of an FC stop by a battery SOC is not more than a reference number of times per reference time period, the controller controls the air supply unit to increase the flow rate of the supplied air so as to remove the condensate in the humidifier and the condensate in the fuel cell stack before the flooding occurs as the condensate in the humidifier is transferred to the cathode at an allowable flow rate or more by the air passing through the humidifier, and
wherein the controller is programmed to control the bypass valve in addition to the air supply unit, based on the amount of the accumulated condensate in the humidifier.

12. A fuel cell system for preventing flooding of a fuel cell stack comprising:
a fuel cell stack having a cathode and an anode;
a humidifier configured to humidify air, including oxygen, that is to be supplied to the cathode;
an air supply unit configured to supply the air to the humidifier;
a first passage configured to guide the air humidified and discharged by the humidifier to the fuel cell stack in which a condensate is generated due to a chemical action between hydrogen, received at the anode, and the oxygen;
a second passage configured to guide the air, a portion of which has been used for generating the condensate in the fuel cell stack, discharged by the fuel cell stack to outside;
a third passage connecting the first passage to the second passage;
a bypass valve disposed at a connection point between the first passage and the third passage to adjust an amount of the air of the first passage, which is bypassed to the third passage; and
a controller programmed to control the air supply unit to adjust a flow rate of the air supplied from the air supply unit, based on an amount of an accumulated condensate in the humidifier, thereby preventing flooding of the fuel cell stack,
wherein the controller is programmed such that, when the amount of the accumulated condensate in the humidifier is not less than a reference value, and a holding time period of an FC stop is not less than a reference time period, the controller controls the air supply unit to increase the flow rate of the supplied air so as to remove the condensate in the humidifier and a condensate in the fuel cell stack before the flooding occurs as the condensate in the humidifier is transferred to the cathode at an allowable flow rate or more by the air passing through the humidifier, and
wherein the controller is programmed to control the bypass valve in addition to the air supply unit, based on the amount of the accumulated condensate in the humidifier.

* * * * *